(12) United States Patent
Allansson et al.

(10) Patent No.: US 7,861,516 B2
(45) Date of Patent: Jan. 4, 2011

(54) METHODS OF CONTROLLING REDUCTANT ADDITION

(75) Inventors: Eive Tord Ronny Allansson, Kungsbacka (SE); Anders Klas Andreasson, V. Frolunda (SE); Claus Friedrich Goersmann, Cambridge (GB); Mats Lavenius, Partille (SE); Martyn Vincent Twigg, Cambridge (GB); Andrew Peter Walker, Chester Springs, PA (US)

(73) Assignee: Johnson Matthey Public Limited Company, London (GB)

( * ) Notice: Subject to any disclaimer, the term of this patent is extended or adjusted under 35 U.S.C. 154(b) by 1002 days.

(21) Appl. No.: 10/561,069

(22) PCT Filed: Jun. 18, 2004

(86) PCT No.: PCT/GB2004/002643
§ 371 (c)(1),
(2), (4) Date: Feb. 5, 2007

(87) PCT Pub. No.: WO2004/113691
PCT Pub. Date: Dec. 29, 2004

(65) Prior Publication Data
US 2007/0214777 A1    Sep. 20, 2007

(30) Foreign Application Priority Data

Jun. 18, 2003 (GB) .................... 0314242.9
Jun. 23, 2003 (GB) .................... 0314463.1
Oct. 1, 2003 (GB) .................... 0322963.0

(51) Int. Cl.
*F01N 3/00* (2006.01)
(52) U.S. Cl. .................. 60/286; 60/274; 60/295; 60/301; 60/303

(58) Field of Classification Search ............. 60/274, 60/286, 295, 301, 303
See application file for complete search history.

(56) References Cited

U.S. PATENT DOCUMENTS 4,427,418 A    1/1984    Kogiso et al.

(Continued)

FOREIGN PATENT DOCUMENTS

DE    199 13 268 C1    8/2000

(Continued)

OTHER PUBLICATIONS

Martin Elsener et al, "Development and Evaluation of a DeNO$_x$ System," *MTZ worldwide*, Nov. 2003, vol. 64, pp. 28-31.

(Continued)

*Primary Examiner*—Thomas E Denion
*Assistant Examiner*—Diem Tran
(74) *Attorney, Agent, or Firm*—RatnerPrestia

(57) ABSTRACT

An exhaust system for a vehicular lean-burn internal combustion engine includes a NO$_x$ reduction catalyst, a source reductant, means (20) for contacting the catalyst with the reductant, means for sensing the temperature of the exhaust gas and/or the catalyst bed and means, when in use, for controlling reductant addition. The reductant addition control means supplies an amount of reductant to the catalyst at a rate corresponding to a measured temperature value of the exhaust gas and/or catalyst bed, which temperature value has been predetermined to correlate, in use, with an amount of NO$_x$ in the exhaust gas.

20 Claims, 7 Drawing Sheets

U.S. PATENT DOCUMENTS

| | | | |
|---|---|---|---|
| 4,923,484 A | 5/1990 | Saitto | |
| 4,945,722 A | 8/1990 | Goerlich | |
| 5,582,002 A | 12/1996 | Pattas | |
| 5,634,952 A | 6/1997 | Kasai et al. | |
| 5,842,341 A * | 12/1998 | Kibe | 60/274 |
| 5,845,487 A * | 12/1998 | Fraenkle et al. | 60/274 |
| 5,956,944 A | 9/1999 | Dementhon et al. | |
| 5,965,098 A | 10/1999 | Boegner et al. | |
| 6,026,640 A | 2/2000 | Kato et al. | |
| 6,119,448 A | 9/2000 | Emmerling et al. | |
| 6,167,698 B1 | 1/2001 | King et al. | |
| 6,311,484 B1 * | 11/2001 | Roth et al. | 60/301 |
| 6,367,320 B1 | 4/2002 | Kueper et al. | |
| 6,378,298 B2 * | 4/2002 | Harima et al. | 60/288 |
| 6,401,450 B1 * | 6/2002 | Hoshi | 60/277 |
| 6,415,602 B1 | 7/2002 | Patchett et al. | |
| 6,487,852 B1 | 12/2002 | Murphy et al. | |
| 6,672,051 B2 * | 1/2004 | Tamura et al. | 60/285 |
| 6,915,629 B2 * | 7/2005 | Szymkowicz | 60/289 |
| 2002/0194841 A1 | 12/2002 | Genderen | |
| 2002/0197721 A1 | 12/2002 | Kinugawa et al. | |
| 2004/0187456 A1 | 9/2004 | Brück | |
| 2006/0107653 A1 | 5/2006 | Nakatani | |

FOREIGN PATENT DOCUMENTS

| | | |
|---|---|---|
| EP | 0 560 991 A1 | 9/1993 |
| EP | 0 341 832 B1 | 1/1996 |
| EP | 0 758 713 A1 | 2/1997 |
| EP | 1 057 519 A1 | 12/2000 |
| EP | 1 111 211 A2 | 6/2001 |
| EP | 1 111 211 A3 | 6/2001 |
| EP | 0 864 732 B1 | 2/2003 |
| EP | 1 291 498 A2 | 3/2003 |
| EP | 1 291 498 A3 | 3/2003 |
| EP | 1 326 011 A2 | 7/2003 |
| EP | 1 326 011 A3 | 7/2003 |
| FR | 2 814 966 A1 | 4/2002 |
| GB | 2 403 165 A | 12/2004 |
| JP | 62-117620 | 5/1987 |
| JP | 2722987 B2 | 11/1997 |
| JP | 11-270327 | 10/1999 |
| JP | 2000-240429 A | 9/2000 |
| JP | 2001-1164927 | 6/2001 |
| JP | 2001-221037 A | 8/2001 |
| JP | 2002-122019 A | 4/2002 |
| JP | 2002-295244 A | 10/2002 |
| WO | WO-98/22209 A1 | 5/1998 |
| WO | WO-00/21647 A1 | 4/2000 |
| WO | WO 03/038248 A1 | 5/2003 |
| WO | WO-2004/113691 A2 | 12/2004 |
| WO | WO-2005/038206 A1 | 4/2005 |

OTHER PUBLICATIONS

Wolfgang Held et al., "Catalytic $NO_x$ Reduction in Net Oxidizing Exhaust Gas," SAE Paper No. 900496.

H. T. Hug et al., "Off-Highway Exhaust Gas After-Treatment: Combining Urea-SCR, Oxidation Catalysis and Traps," SAE Paper No. 930363.

\* cited by examiner

METHODS OF CONTROLLING REDUCTANT ADDITION

This application is the U.S. National Phase application of PCT International Application No. PCT/GB2004/002643, filed Jun. 18, 2004, and claims priority of British Patent Application No. 0314242.9, filed Jun. 18, 2003; British Patent Application No. 0314463.1, filed Jun. 23, 2003; and British Patent Application No. 0322963.0, filed Oct. 1, 2003.

The present invention relates to methods of controlling reductant addition to catalytically convert $NO_x$ in exhaust gas of an internal combustion engine to $N_2$.

BACKGROUND OF THE INVENTION

It is known to catalytically reduce $NO_x$ in exhaust gas of an internal combustion engine to $N_2$ with a suitable reductant. Three examples are selective catalytic reduction (SCR), lean-$NO_x$ catalysis and $NO_x$-trap regeneration.

In SCR, the reductant is typically a $NO_x$-specific reactant. By "$NO_x$-specific reactant" herein, we mean a reducing agent that, in most conditions, preferentially reduces $NO_x$ over other components of a gaseous mixture. Examples of $NO_x$-specific reactants include nitrogenous compounds such as nitrogen hydrides, e.g. ammonia ($NH_3$) or hydrazine as such or by way of a $NH_3$ precursor.

By "$NH_3$ precursor" we mean one or more compounds from which $NH_3$ can be derived, e.g. by hydrolysis. These include urea ($CO(NH_2)_2$) as an aqueous solution or as a solid or ammonium carbamate ($NH_2COONH_4$). If the urea is used as an aqueous solution, a eutectic mixture, e.g. 32.5% urea (aq), is preferred. Additives can be included in the aqueous solutions to reduce the crystallisation temperature.

Known SCR catalysts include Pt-based catalysts, which can catalyse the reduction of $NO_x$ with $NH_3$ at between about 175° C. and about 250° C., medium temperature vanadium-based catalysts e.g. $V_2O_5/TiO_2$, which operate in the temperature range between about 260° C. and about 450° C. and zeolite-based catalysts which function with increasing activity at increasing temperature.

Several chemical reactions occur in the $NH_3$ SCR system, all of which represent desirable reactions which reduce $NO_x$ to elemental nitrogen. The overall desired reaction is represented in equation (1).

$$4NO + 4NH_3 + O_2 \rightarrow 4N_2 + 6H_2O \tag{1}$$

Competing, non-selective reactions with oxygen can produce secondary emissions or may unproductively consume $NH_3$. One such non-selective reaction is the complete oxidation of $NH_3$, represented in equation (2).

$$4NH_3 + 5O_2 \rightarrow 4NO + 6H_2O \tag{2}$$

It will be appreciated that at lower temperatures, below about 100-200° C., $NH_3$ can also react with $NO_2$ to produce an explosive mixture of ammonium nitrate ($NH_4NO_3$) and ammonium nitrite ($NH_4NO_2$). For the avoidance of doubt, the present invention does not embrace such reactions or the promotion of conditions which bring them about. For example, the reaction can be avoided by ensuring that the temperature does not fall below about 200° C. or by supplying into a gas stream less than the precise amount of $NH_3$ necessary for the stoichiometric reaction with $NO_x$ (1 to 1 mole ratio).

Urea hydrolyses at temperatures above 160° C. according to equation (3) to liberate $NH_3$ itself. It is also believed to decompose thermally at this temperature and above according to equations (4) and (5) resulting in reduction of $NO_x$, as evidenced by formation of CO during SCR processes with urea (see SAE 900496 and SAE 930363 (both incorporated herein by reference)).

$$CO(NH_2)_2 + H_2O \rightarrow 2NH_3 + CO_2 \tag{3}$$

$$CO(NH_2)_2 \rightarrow .NH_2 + CO \tag{4}$$

$$.NH_2 + NO \rightarrow N_2 + H_2O \tag{5}$$

Lean-$NO_x$ catalysts (LNCs) are sometimes also referred to in the literature as lean-$NO_x$ reduction catalysts, "DeNOx catalysts" and $NO_x$ occluding catalysts.

In lean-$NO_x$ catalysis, hydrocarbons (HC) react with nitrogen oxides ($NO_x$), rather than oxygen ($O_2$), to form nitrogen ($N_2$), carbon dioxide ($CO_2$) and water ($H_2O$) according to reaction (6).

$$\{HC\} + NO_x \rightarrow N_2 + CO_2 + H_2O \tag{6}$$

The competitive, non-selective reaction with oxygen is given by reaction (7).

$$\{HC\} + O_2 \rightarrow CO_2 + H_2O \tag{7}$$

There are two preferred groups of LNC to selectively promote the desired reaction (6) described in the literature: platinum (Pt) on alumina ($Al_2O_3$) and copper (Cu)-substituted zeolite such as Cu/ZSM-5.

A typical $NO_x$-trap formulation includes a catalytic oxidation component, such as Pt, a $NO_x$-storage component, such as compounds of alkali metals e.g. potassium and/or caesium; compounds of alkaline earth metals, such as barium or strontium; or compounds of rare-earth metals, typically lanthanum and/or yttrium; and a reduction catalyst, e.g. rhodium. One mechanism commonly given for $NO_x$-storage during lean engine operation for this formulation is that, in a first step, the nitric oxide reacts with oxygen on active oxidation sites on the Pt to form $NO_2$. The second step involves adsorption of the $NO_2$ by the storage material in the form of an inorganic nitrate.

When the engine runs intermittently under enriched conditions or at elevated temperatures, the nitrate species become thermodynamically unstable and decompose, producing NO or $NO_2$. Under rich conditions, these nitrogen oxides are reduced by carbon monoxide, hydrogen and hydrocarbons to $N_2$, which can take place over the reduction catalyst.

Whilst the inorganic $NO_x$ storage component is typically present as an oxide, it is understood that in the presence of air or exhaust gas containing $CO_2$ and $H_2O$ it may also be in the form of the carbonate or possibly the hydroxide. We also explain in our WO 00/21647 (incorporated herein by reference) that $NO_x$-specific reactants can be used to regenerate a $NO_x$-trap.

EP-B-0341832 (incorporated herein by reference) describes a process for combusting particulate matter in diesel exhaust gas, which method comprising oxidising nitrogen monoxide in the exhaust gas to nitrogen dioxide on a catalyst, filtering the particulate matter from the exhaust gas and combusting the filtered particulate matter in the nitrogen dioxide at up to 400° C. Such a system is available from Johnson Matthey and is marketed as the CRT®.

For the purposes of the present specification, generally we refer to methods of catalytic reduction of $NO_x$ to $N_2$ in exhaust gases of internal combustion engines with a suitable reductant as $NO_x$-reduction methods and to catalysts for promoting the reduction of $NO_x$ to $N_2$ as $NO_x$-reduction catalysts. Such catalysts include SCR catalysts, lean-$NO_x$ catalysts and $NO_x$-traps.

A problem with the above $NO_x$ reduction methods is to control the addition of the reductant. If too little reductant is added, $NO_x$ reduction may be inadequate to meet an emission standard. If too much reductant is added this can cause a number of problems. For example, if the reductant is ammonia, its release into the atmosphere is undesirable because it is a biological poison and it has an unpleasant odour. Whilst excess ammonia can be oxidised using a suitable catalyst downstream of the $NO_x$-reduction catalyst, this produces $NO_x$, thus defeating the very purpose of the $NO_x$ reduction method. Hydrocarbon fuels, e.g. diesel or gasoline, are also legislated components of exhaust gas and so emission of excess hydrocarbon reductant can cause the system to fail a relevant emission standard.

Systems to control reductant addition are known, but tend to require very complicated control regimes involving multiple sensor inputs and processors to run complex algorithms. As a result, such systems are very expensive.

US-A-2002/0194841 (incorporated herein by reference) discloses a method of reducing $NO_x$ emissions from vehicular diesel engines by an external reductant supplied to a SCR system including a reducing catalyst, which method comprising the steps of sensing one or more engine operating parameters, such as speed and torque from a speed/load sensor, to predict a concentration of $NO_x$ emissions indicative of the actual quantity of $NO_x$ emissions produced by the engine when the catalyst temperature is within a set range and metering the external reductant to the catalyst at a rate sufficient to cause the catalyst to reduce the calculated concentration of $NO_x$ emissions.

JP-A-2002-122019 (incorporated herein by reference) discloses a method of preventing thermal degradation in a $NO_x$-trap by detecting the temperature in the $NO_x$-trap and regulating reductant addition to maintain the $NO_x$-trap temperature within a pre-determined range.

DE-A-9913268 (incorporated herein by reference) discloses a system for monitoring the efficiency of a $NO_x$ reduction catalyst in a lean burn engine comprising a fuel feed device for dispensing a predetermined quantity of fuel into exhaust gas upstream of the catalyst to make available an amount of chemical energy and, dependent on catalyst efficiency, to provide an amount of thermal energy, flow and temperature sensors for measuring the thermal energy into and out of the catalyst and a data processing unit communicating with the fuel feed device and the temperature sensors, which constructs an energy balance for the catalyst, and hence provides a correlation signal indicating the performance of the catalyst.

In JP-A-62-117620 (incorporated herein by reference), there is described a method removing nitrogen oxides in gasoline engine exhaust gas employing two $NO_x$-traps arranged in parallel wherein the $NO_x$-traps are used alternately to absorb $NO_x$ from the exhaust gas under the control of a two-way valve. The off-line $NO_x$-trap is regenerated using a suitable reductant such as hydrogen, ammonia, carbon monoxide or methane.

"Development and evaluation of a $DeNO_x$ system based on urea SCR", by Martin Elsener et al., MTZ worldwide, November 2003, Volume 64, p. 28-31 (incorporated herein by reference) describes the use of a $NO_x$ sensor which is cross-sensitive against ammonia to provide feedback control of reductant delivery in an exhaust system including a SCR catalyst.

We have investigated methods of calibrating reductant addition and of controlling reductant addition by feedback. We have now devised a number of simple methods and systems that are cheap and effective at reducing reductant-based emissions. Systems embodying these methods are particularly relevant to the retrofit market.

SUMMARY OF THE INVENTION

A first aspect of the invention makes use of only a single temperature measurement, e.g. using a thermocouple, as the control input. Preferably, no reductant is added below a pre-determined temperature because the temperature is too low for the complete $NO_x$ removal reaction to take place, i.e. reductant addition is controlled so that it is supplied only when the $NO_x$ reduction catalyst is active. As the load on an engine is increased, the $NO_x$ level in the exhaust gas increases in a roughly linear fashion. Similarly, the exhaust gas temperature increases with load. We expect, therefore, that for a given engine in a particular application there is a relationship between $NO_x$ content in the exhaust gas and its temperature. And, that this may approximate to a linear relationship. So, in its simplest form, in this aspect of the invention, the rate of reductant introduced is approximately proportional to the temperature of the exhaust gas. Addition of a reductant in this way provides a very efficient and simple way of maintaining $NO_x$ reduction on a vehicle. The actual amount of reductant added at different exhaust gas temperatures can depend on the nature of the specific application. However, the trend is for more reductant to remove larger amounts of $NO_x$ at higher temperatures. In practice a calibration process would determine the exact amounts.

In a system embodiment of the first aspect, the invention provides an exhaust system for a vehicular lean-burn internal combustion engine, which system comprising a catalyst for reducing $NO_x$ in exhaust gas to $N_2$ with a suitable reductant, a source of reductant, means for contacting the catalyst with the reductant, means for sensing the temperature of the exhaust gas and/or the catalyst bed and means, when in use, for controlling reductant addition, wherein the reductant addition control means supplies an amount of reductant to the catalyst at a rate corresponding to a measured temperature value of the exhaust gas and/or catalyst bed, which temperature value has been pre-determined to correlate, in use, with an amount of $NO_x$ in the exhaust gas thereby to promote the reduction of the $NO_x$.

In a method embodiment of the first aspect, the invention provides a method of calibrating a rate of reductant addition required to reduce $NO_x$ in an exhaust gas of a vehicular lean-burn internal combustion engine to $N_2$ over a suitable catalyst, which method comprising measuring $NO_x$ in the exhaust gas at a plurality of exhaust gas and/or catalyst bed temperatures and correlating each exhaust gas and/or catalyst bed temperature value with a rate of reductant addition required to reduce the $NO_x$ over the catalyst.

It is known generally in the prior art to determine the temperature of a $NO_x$ reduction catalyst and to discontinue addition of reductant when the catalyst temperature is below a pre-determined range to prevent formation of ammonium nitrate and ammonium nitrite and to prevent emissions of reductant at below the catalyst light-off temperature for $NO_x$ reduction. The invention of the first aspect is different from this prior art in that the catalyst and/or exhaust gas temperature is used to predict the amount of $NO_x$ in the exhaust gas and, accordingly, the rate of reductant addition required to reduce such $NO_x$ amount.

A second aspect of the invention provides a simple means of controlling reductant addition by feedback in real-time. In the second aspect, an oxidation catalyst is disposed downstream of the $NO_x$ reduction catalyst which is contacted with a reductant. The system is arranged so that the gas is always lean over the oxidation catalyst, e.g. by using secondary addition of air if required. As in the first aspect described above, desirably no reductant is added below a certain critical exhaust gas temperature, at which $NO_x$ reduction is ineffective (see hashed line to $\Delta T$ axis in FIG. 4B). Above this temperature, increasing the amount of reductant causes increasing amounts of $NO_x$ in the exhaust gas to be reduced. In practice there is a limit to this effect, and then introducing more reductant fails to enhance $NO_x$ reduction (illustrated in FIG. 4A). So, there is a region of small excess reductant slip from the $NO_x$ reduction catalyst that corresponds to a desirable addition rate above which any more reductant is wasted and can cause failure of a relevant emission standard.

Since the overall gas composition is arranged to be lean, any excess reductant can be oxidised over the downstream oxidation catalyst, and the resulting exotherm may result in a temperature increase across the oxidation catalyst. The inlet temperature to the oxidation catalyst may vary considerably during use, but in this method we are concerned only with the $\Delta T$ that is a measurement of the excess reductant present. The control strategy (illustrated in FIG. 4B) is based in adjusting the rate of reductant addition to keep the measured $\Delta T$ within a pre-determined range corresponding to an optimum $NO_x$ removal (shaded region in FIG. 4B): reductant addition rate is increased if $\Delta T$ is too small, or decreased if $\Delta T$ is larger than desired for optimum efficient $NO_x$ conversion.

According to a system embodiment of the second aspect of the invention, there is provided an exhaust system for a vehicular lean-burn internal combustion engine, which system comprising a catalyst for reducing $NO_x$ in exhaust gas to $N_2$ with a suitable reductant, a source of reductant, means for contacting the $NO_x$ reduction catalyst with the reductant, an oxidation catalyst disposed downstream of the $NO_x$ reduction catalyst, means for determining a temperature difference ($\Delta T$) across the oxidation catalyst and means, when in use, for controlling reductant addition, wherein the reductant addition control means controls the rate of reductant addition to maintain $\Delta T$ within a pre-determined range, wherein the system is configured so that the exhaust gas composition over the oxidation catalyst is lean.

A method embodiment of the second aspect of the invention provides a method of controlling, by feedback, addition of reductant to a catalyst suitable for reducing $NO_x$ in an exhaust gas of a vehicular lean-burn internal combustion engine to $N_2$, which method comprising providing an oxidation catalyst for oxidising the reductant downstream of the $NO_x$ reduction catalyst, measuring the exhaust gas temperature upstream of the oxidation catalyst, measuring the exhaust gas temperature downstream of the oxidation catalyst, determining the difference between the inlet and the outlet temperatures ($\Delta T$) and adjusting the rate of reductant addition so that $\Delta T$ is within a pre-determined range.

One problem with the application of the second aspect to systems including a $NO_x$-trap is that it may be necessary to use rich (i.e. lambda <1) exhaust gas to regenerate the $NO_x$-trap. We propose three embodiments to enable the second aspect of the present invention to be extended to such $NO_x$-traps without the need for secondary air injection.

In a first embodiment shown in FIG. 5, at least two $NO_x$-traps are arranged in parallel, each with an associated reductant injector. The gas hourly space velocity (GHSV) over each $NO_x$-trap is dependent on the relative backpressure in each line, but normally the system will be set up so that the arrangement is the same in each, in which case the GHSV will be substantially the same in each line. $NO_x$-trap regeneration is conducted in series in the $NO_x$-traps in the system, i.e. at any instant, at least one line not having reductant injected, so that when the exhaust gas from all $NO_x$-traps in the system is mixed, its composition is lean, i.e. lambda >1. The mixed exhaust gas is passed to the oxidation catalyst of the second aspect invention described hereinabove.

In a second embodiment shown in FIGS. 6A and 6B, a $NO_x$-trap is coated on a single substrate monolith and at least two injectors are disposed on the upstream side of the substrate monolith and the arrangement is such that injected reductant is directed to a specific zone of the monolith substrate.

An advantage of this embodiment is that less space is required on the vehicle to accommodate the system compared with the first embodiment and other systems using parallel $NO_x$-traps.

A third embodiment is similar to the second embodiment and is shown in FIGS. 7 and 8. It comprises an upstream three-way flap valve and a reductant injector located either side of the flap valve. During $NO_x$-trap "filling" the flap valve can be trimmed so that it lies parallel to the direction of exhaust gas flow. During regeneration, the flap valve is deployed to fold over on the side of the $NO_x$-trap receiving the reductant, thereby directing a portion of the exhaust gas flow away from the $NO_x$-trap being regenerated and reducing the flow of exhaust gas therein.

An advantage of this embodiment is that the reduced exhaust gas flow in the portion of the $NO_x$-trap to be regenerated promotes reduction of the released $NO_x$ so that regeneration can be done more efficiently than in the second embodiment, i.e. less reductant is required. Furthermore, we believe that the second and third embodiments are patentably novel and inventive in their own right.

Therefore, according to a third aspect, the invention provides an exhaust system for a vehicular lean-burn internal combustion engine comprising a $NO_x$-trap disposed on a unitary monolith substrate, the upstream end of which substrate is subdivided in the direction of fluid flow into at least two zones and means for successively contacting a fraction of the at least two zones with a reductant whilst the $NO_x$-trap as a whole remains in-line to exhaust gas flow.

In one embodiment, the means for contacting the $NO_x$-trap with reductant comprises an injector disposed sufficiently close to the upstream end of the substrate so that liquid droplets of reductant contact the $NO_x$-trap. The intention of injecting reductant into the exhaust gas upstream of a $NO_x$-trap is to reduce the oxygen concentration of the exhaust gas, i.e. to enrich, but not necessarily to make rich (lambda <1), the exhaust gas composition. In prior art arrangements, reductant is introduced far upstream of the $NO_x$-trap, e.g. during the exhaust stroke of one or more engine cylinders or, in the case of EP 0758713A (incorporated herein by reference), for example, reductant is injected into the exhaust conduit upstream of an oxidation catalyst and diesel particulate filter disposed upstream of the $NO_x$-trap. In either case, the droplets of liquid reductant evaporate. Furthermore, at full gas flow, a significant amount of reductant is required merely to remove all the excess oxygen (through combustion) before any degree of richness is obtained. Where the reductant is a hydrocarbon fuel such as Diesel, this approach is costly on fuel economy.

We have found that by deliberately restricting evaporation of injected fuel by introducing controlled size fuel droplets close to the upstream face of the $NO_x$-trap catalyst, liquid droplets of fuel can impinge on the catalyst surface. Where they do, the environment is strongly reducing and this can reduce stored nitrate in the vicinity. Hence, this arrangement can significantly reduce the fuel penalty associated with $NO_x$-trap regeneration.

Particle dynamics can cause the droplets of liquid reductant to pass through a conventional flow-through ceramic or metal monolith substrate without impinging on the $NO_x$-absorbent carried on the walls thereof. In order to increase the possibility of the reductant contacting the $NO_x$-absorbent, in one embodiment a foam substrate comprising a ceramic or metal foam is used. An alternative embodiment utilises metallic partial filter substrates including internal baffles, such as disclosed in EP-A-1057519 or WO 03/038248 (both incorporated herein by reference). According to a further embodiment, the $NO_x$-trap comprises a conventional ceramic wall-flow filter; here pressure-drop driven convention should ensure that fuel droplets contact stored $NO_x$. In this latter embodiment, efficient filtration of particulate matter (PM) per se is not important so porous filters could be used, but combined $NO_x$ and PM control would be desirable as described in JP-B-2722987 (JP-A-06-159037) (incorporated herein by reference), i.e. the filter includes a soot combustion catalyst/NO oxidation catalyst e.g. Pt, a $NO_x$ absorber such as barium oxide and, optionally, a $NO_x$ reduction catalyst e.g. rhodium.

Advantage can also be made of particle dynamics when an oxidation catalyst is coated on a conventional flow-through monolith disposed between the reductant injector and the $NO_x$-trap. Depending on the open-frontal area and cell density of the monolith, fuel droplets can pass through the oxidation catalyst substantially without oxidation and be available for reducing stored $NO_x$ in the $NO_x$-trap. By contrast, evaporated hydrocarbon reductant is more likely to be oxidised on the oxidation catalyst.

According to a further embodiment, the means for contacting the $NO_x$-trap fraction with reductant comprises a flap valve disposed on the upstream end of the substrate thereby to subdivide the substrate into the at least two zones. In one arrangement, an injector is associated with each zone.

In a method of the third aspect, a $NO_x$-trap disposed on a monolith substrate in the exhaust system of a vehicular lean-burn internal combustion engine is regenerated by contacting a fraction of the $NO_x$-trap with a reductant while the $NO_x$-trap as a whole remains in-line to exhaust gas flow.

In one embodiment, the reductant contacts the fraction of the $NO_x$-trap at reduced exhaust gas flow.

According to a fourth aspect of the invention, there is provided an exhaust system for a vehicular lean-burn internal combustion engine comprising a $NO_x$ reduction catalyst, a reductant injector disposed upstream of the catalyst and means, when in use, for controlling reductant addition, wherein the reductant addition control means supplies reductant to the catalyst at a rate which is predetermined to correlate with a desired $NO_x$ conversion at the average duty cycle speed of the vehicle at all vehicle speeds in a duty cycle.

The invention of the fourth aspect has particular application to the retrofit market for vehicles of a limited duty cycle such as buses or refuse trucks. The idea is to determine what rate of reductant injection is required to reduce a chosen quantity of $NO_x$, e.g. 90%, in a $NO_x$ reduction catalyst at the average duty cycle speed. For example, when the $NO_x$ reduction catalyst comprises a $NO_x$-trap, the system controller can be arranged, when in use, to generate a continuous tempo and quantity of HC fuel injection e.g. injection at 2 seconds every minute. The system controller can also be arranged to provide occasional relatively long rich HC fuel pulses to ensure that the $NO_x$-trap is substantially completely regenerated, followed by the more frequent sequence of shorter enrichment pulses to maintain the storing capability of the $NO_x$-trap. The exact detail of the injection strategy depends on the vehicle and its duty cycle.

At speeds higher than the average duty cycle speed, there would be more $NO_x$ and a greater mass airflow and so $NO_x$ conversion overall would fall off, because of insufficient reductant but because higher speed would be less likely e.g. in city centre buses, the increased fuel penalty for $NO_x$ conversion achieved resulting from such higher speeds would be less across the entire drive cycle compared with prior art arrangements, e.g. that use delayed injection timing. The correlation of the rate of HC injection to average duty cycle speed can be tailored to the particular application, e.g. buses in Manchester (UK) city centre would be expected to encounter different duty cycles to those in London (UK).

In one embodiment of the fourth aspect, an oxidation catalyst is disposed between the reductant injector and the $NO_x$-trap for increasing the temperature of the $NO_x$-trap for regeneration and to remove oxygen from the exhaust gas to ensure a rich exhaust gas for regeneration of the $NO_x$-trap.

A method of reducing $NO_x$ in the exhaust gas of a vehicular internal combustion engine according to the fourth aspect comprises introducing a reductant into the exhaust gas, at all vehicle speeds in a duty cycle, at a rate correlating with a desired $NO_x$ conversion at the average duty cycle speed and contacting the exhaust gas containing the $NO_x$ and the reductant with a $NO_x$ reduction catalyst.

In a particular arrangement, the $NO_x$ reduction catalysts and systems for delivering reductant described herein are disposed downstream of the arrangement described in EP-B-0341832, mentioned hereinabove.

Unless otherwise described, the catalysts for use in the present invention are coated on high surface area substrate monoliths made from metal or ceramic or silicon carbide, e.g. cordierite, materials. A common arrangement is a honeycomb, flowthrough monolith structure of from 100-600 cells per square inch (cpsi) such as 300-400 cpsi (15.5-93.0 cells $cm^{-2}$, e.g. 46.5-62.0 cells $cm^{-2}$).

The internal combustion engine can be a diesel or lean-burn gasoline engine, such as a gasoline direct injection engine. The diesel engine can be a light-duty engine or a heavy-duty engine, as defined by the relevant legislation.

BRIEF DESCRIPTION OF THE DRAWINGS

In order that the present invention may be more fully understood, embodiments thereof will be described with reference to the accompanying drawings, in which.

DETAILED DESCRIPTION OF THE DRAWINGS

Figure 1:
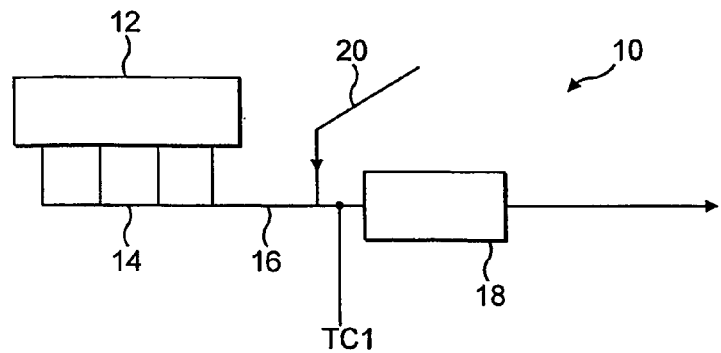
FIG. 1 is a schematic of a system according to the first aspect of the invention.

A system according to the first aspect of the invention generally referenced by the numeral 10 is depicted in FIG. 1 in which 12 represents a diesel engine, 14 the exhaust manifold, 16 the exhaust line and 18 a $NO_x$ reduction catalyst, such as a 5 wt % Cu/Beta-zeolite lean-$NO_x$ catalyst. Reductant supply means 20 includes an injector for injecting a quantity of diesel fuel into the exhaust line 16 upstream of catalyst 18. Thermocouple TC1 detects the temperature of the exhaust gas at the inlet to catalyst 18 and relays the detected temperature to a processor in the engine control unit (ECU (not shown)).

Figure 2A:
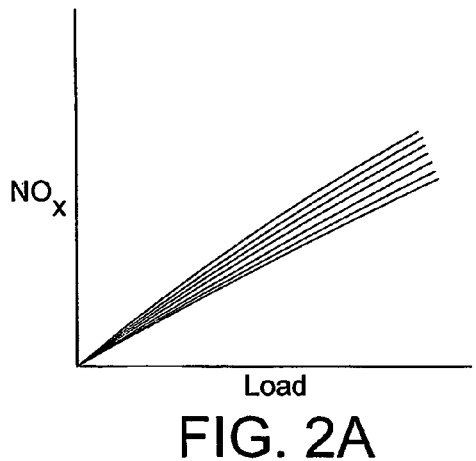
FIG. 2A is a schematic graph plotting $NO_x$ concentration in the exhaust gas of the system of FIG. 1 against engine load.
Figure 2B:
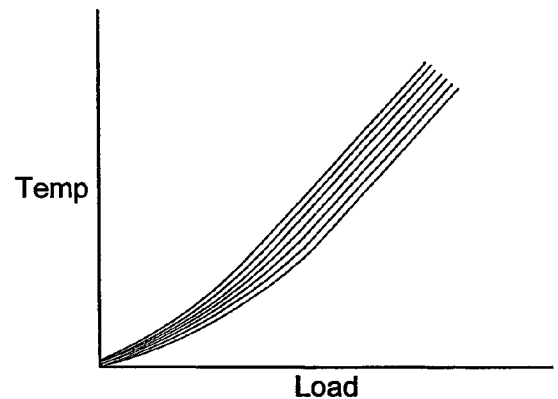
FIG. 2B is a schematic graph plotting temperature in the exhaust gas of the system of FIG. 1 against engine load.
Figure 2C:
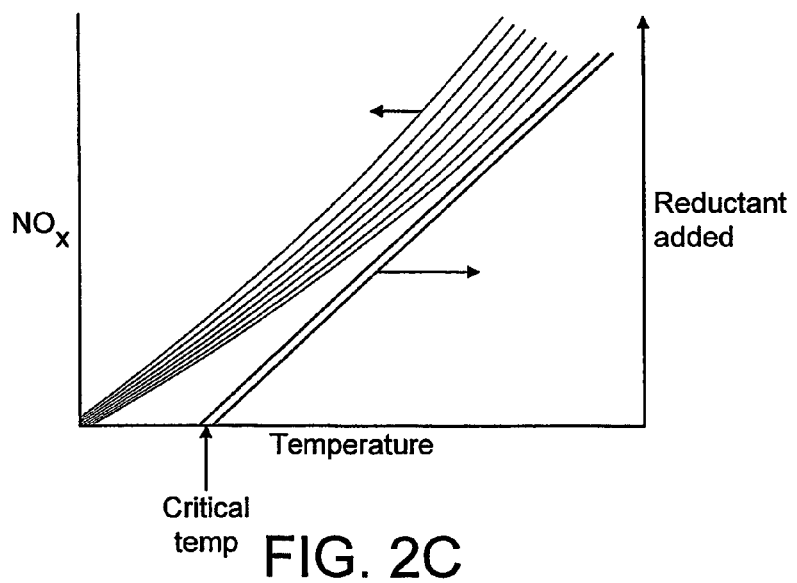
FIG. 2C is a schematic graph plotting temperature in the exhaust gas of the system of FIG. 1 against $NO_x$ concentration (left hand y-axis) and reductant addition (right-hand y-axis)

As the load on an engine is increased, the $NO_x$ level in the exhaust gas increases in an approximately linear manner. Similarly, the exhaust gas temperature increases with load. Below a certain critical temperature no reductant is added because the temperature is too low for the complete $NO_x$ removal reaction to take place. FIGS. 2A and 2B show in graphical form representations of correlations of exhaust gas $NO_x$ concentration against engine load and temperature against engine load over a duty cycle of particular engine 12. In practice, the actual amount of reductant added at different exhaust gas temperatures will depend on the nature of the specific duty cycle, but there will be a trend for more reductant to be needed to remove larger amounts of $NO_x$ at higher temperatures. Such determinations can be conducted using appropriate apparatus and techniques known to the person skilled in the art e.g. using a suitable engine dynamometer and $NO_x$ sensor. From these measurements it is possible to calculate the rate of reductant addition required to reduce the $NO_x$ in the exhaust gas to $N_2$ on the catalyst over the drive cycle and to correlate this with exhaust gas temperature, as shown in FIG. 2C. The correlations can be loaded onto the ECU processor of a fleet of such vehicles operating the system of FIG. 1 and stored as look up tables. In use, the rate and quantity of reductant addition is controlled by the ECU to be proportional to the temperature of the exhaust gas as detected by thermocouple TC1. Addition of reductant in this way provides an efficient and simple way of controlling $NO_x$ reduction on a vehicle.

Figure 3:
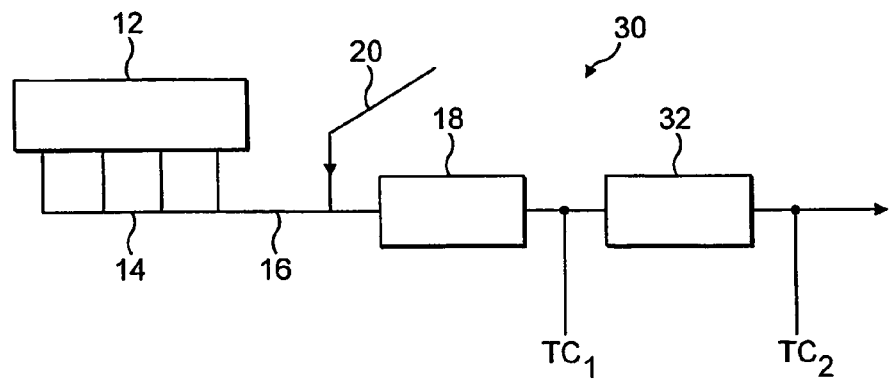
FIG. 3 is a schematic of a system according to the second aspect of the invention.
Figure 4A:
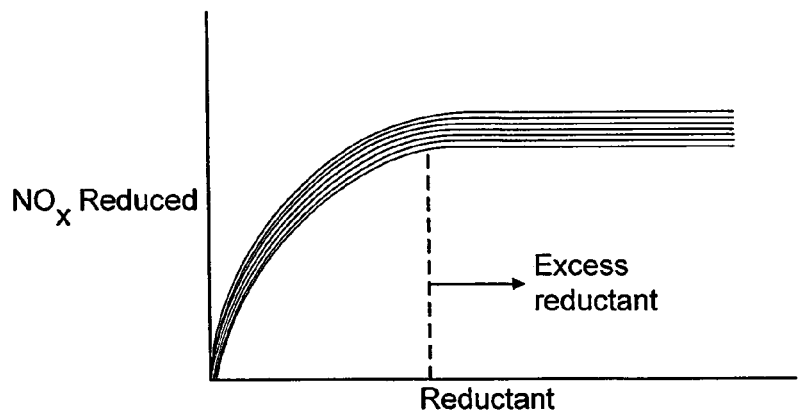
FIG. 4A is a schematic graph plotting $NO_x$ reduced over the $NO_x$ reduction catalyst in the system of FIG. 3 against reductant addition.
Figure 4B:
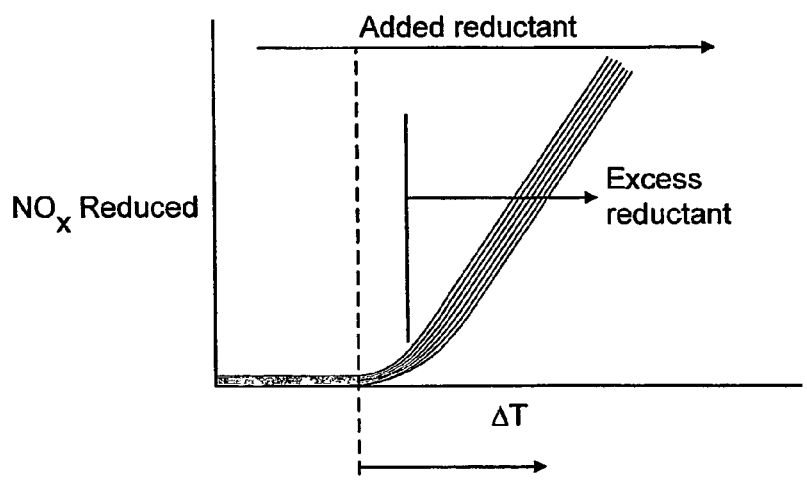
FIG. 4B is a schematic graph plotting $NO_x$ reduced over the $NO_x$ reduction catalyst in the system of FIG. 3 against $\Delta T$ showing addition of reductant at above a critical temperature (hashed line to x-axis) and optimal reductant addition corresponding to detected $\Delta T$ (shaded region)

A system, generally referenced as 30, according to one embodiment according to the second aspect of the invention is shown in FIG. 3, with like features from FIG. 1 sharing the same reference numerals. The additional features new to the system of FIG. 1 shown in FIG. 3 include oxidation catalyst 32, e.g. 1 wt % platinum supported on a gamma-alumina washcoat, that TC1 is located downstream of $NO_x$ reduction catalyst 18 between catalyst 18 and oxidation catalyst 32 and a second thermocouple TC2 is located downstream of oxidation catalyst 32.

In use, the system is operated in such a way as to ensure the gas is always lean over the oxidation catalyst 32. As in the system of FIG. 1, no reductant is added below a certain critical exhaust gas temperature, at which the $NO_x$ reduction catalyst is below its light-off temperature for catalysing $NO_x$ reduction. Above this temperature, increasing the amount of reductant causes increasing amounts of $NO_x$ in the exhaust gas to be reduced. Small excess reductant slip is oxidised over oxidation catalyst 32 and the resulting exotherm results in a temperature increase across the catalyst as measured by the difference in temperatures detected at TC2 and TC1, i.e. $\Delta T = TC2 - TC1$. The control strategy is to adjust the rate of reductant addition to keep the measured $\Delta T$ at substantially a predetermined value corresponding to optimum $NO_x$ removal. The reductant flow is increased if $\Delta T$ is too small, or decreased if $\Delta T$ is larger than desired for optimum efficient $NO_x$ conversion.

Figure 5:
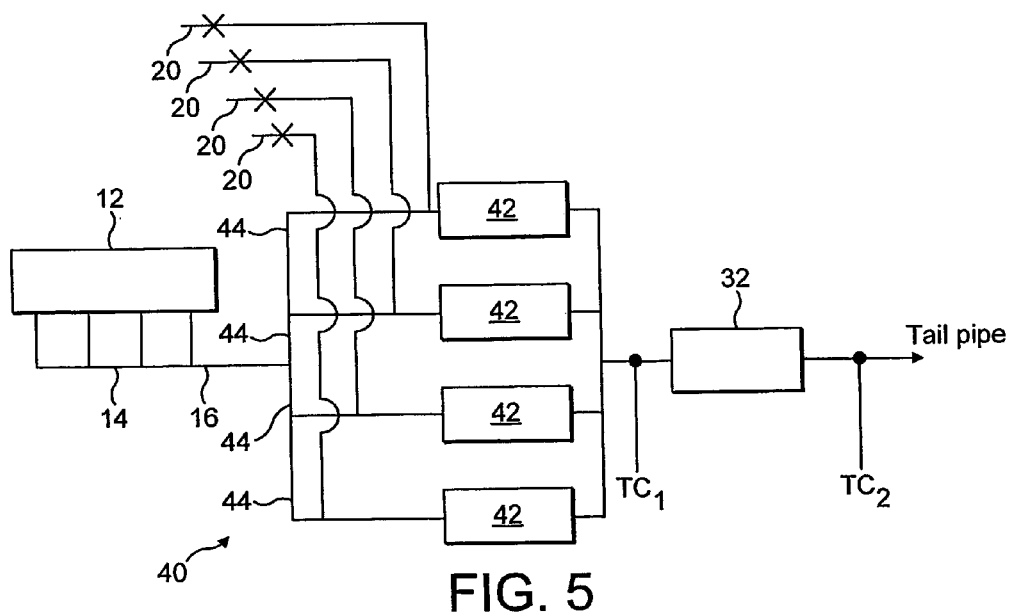
FIG. 5 is a schematic of a system according to one embodiment of the second aspect of the invention.

A system, generally referenced as 40, according to a second embodiment of the second aspect of the invention is shown in FIG. 5, with like features from FIG. 3 sharing the same reference numerals. The additional features new to the system of FIG. 3 shown in FIG. 5 include multiple $NO_x$-traps 42 arranged in parallel exhaust lines 44, each line having its own reductant supply means 20.

This arrangement of the second aspect according to the invention and shown in FIG. 3 presents no particular problem when applied to lean $NO_x$ catalyst or ammonia SCR systems that operate under lean conditions, but $NO_x$-trap 42 regeneration is more problematical. One problem resulting from the need for rich $NO_x$-trap regeneration is that downstream oxidation catalyst 32 cannot remove excess reductant in a deficiency of oxygen. This could lead to high tailpipe reductant emissions as well as other possible problems.

The system of FIG. 5 shows how it is possible to split the exhaust gas flow into two or more parallel lines 44 each with its own $NO_x$-trap 42 and reductant injector 20. At any one time, at least one line is not having reductant injected, so when the total $NO_x$-trap 42 exit gas streams are mixed, the resulting gas is overall lean before passing over the downstream oxidation catalyst 32. In this way any excess reductant is oxidised, and the resulting $\Delta T$ can be used to control the $NO_x$-reduction system as described for the FIG. 3 embodiment above.

Figure 6A:
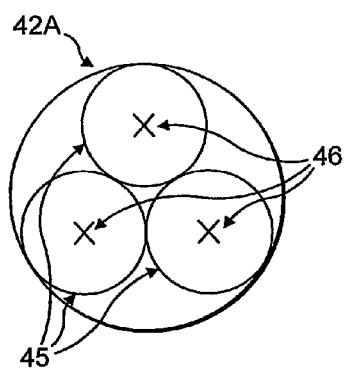
FIG. 6A is a schematic of another embodiment of the second aspect of the invention showing an end-on view of a $NO_x$-trap comprising a unitary substrate monolith showing the injection points and spray zones of multiple reductant injectors at the upstream end of the substrate.
Figure 6B:
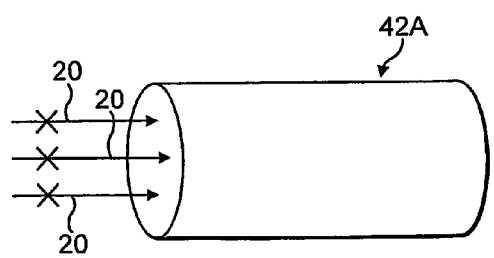
FIG. 6B is a schematic side view of the unitary substrate monolith shown in FIG. 6A.

A third embodiment of the second aspect of the invention is shown in FIGS. 6A and 6B, wherein the plurality of parallel $NO_x$-traps 42 of the FIG. 5 embodiment are replaced by a single unitary $NO_x$-trap 42A and three reductant supply means 20 disposed equidistantly at the upstream end of the $NO_x$-trap and directing a reductant spray onto juxtaposed zones 45 on the front face of the substrate monolith whose centres are defined by injection points 46. This arrangement provides the same overall effect as the first embodiment illustrated in FIG. 5 but using a larger single, i.e. unitary $NO_x$-trap equipped with two or more reductant injectors. The injectors are operated in a sequential manner so at any one time only part of the $NO_x$-trap is undergoing regeneration, and exit gas from this part is mixed with exhaust gas from parts not being regenerated to provide an overall lean gas stream for oxidation on catalyst 32.

The reductant supply means for this embodiment can be arranged to provide a controlled size of fuel droplets close to the catalyst front so that liquid droplets impinge on the catalyst surface. Where they do, the environment will be strongly reducing and reduce stored nitrate in the vicinity. An advantage of this arrangement is that the fuel penalty for $NO_x$-trap regeneration is less than for a system employing modulation of injection timing in one or more cylinders of the engine.

Figure 7:
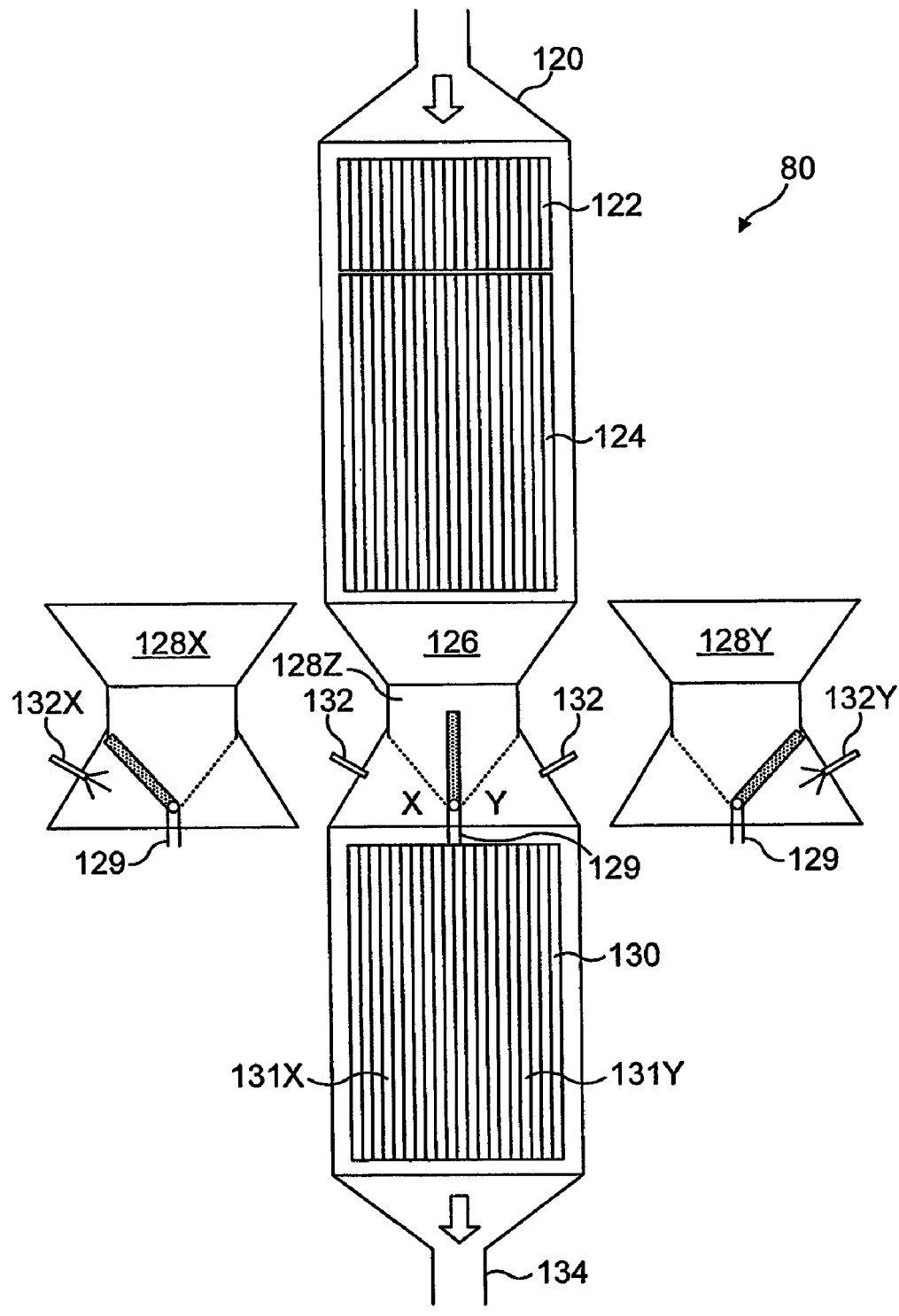
FIG. 7 is a schematic sectional view of an embodiment of the third aspect of the invention including a $NO_x$-trap in combination with a soot combustion reactor for use in treating the exhaust gas of a diesel engine.

Referring to FIG. 7, an exhaust gas aftertreatment system 80 comprises a soot combustion reactor 120 the inlet of which is connected to the exhaust manifold of a diesel engine (not shown). Reactor 120 at its upstream portion contains oxidation catalyst 122 consisting of a ceramic honeycomb carrying an alumina-based washcoat and Pt. At its downstream portion reactor 120 contains wall-flow filter 124, consisting of filter-grade ceramic honeycomb, the passages of which are alternately plugged and unplugged at the inlet end and alternately plugged at the outlet end, wherein passages plugged at the inlet end are unplugged at the outlet end, and vice versa. Such an arrangement is described in EP-B-0341832 and the arrangement is known as the CRT®. From the outlet end of reactor 120 plenum 126 continues as the operating chamber of flap valve 128X,Y, Z at the inlet of $NO_x$-trap vessel 130. Vessel 130 contains $NO_x$-trap 131X,Y consisting of a flowthrough ceramic honeycomb monolith substrate carrying an alumina washcoat containing barium oxide and metallic Pt and Rh. The fulcrum of flap valve 128X,Y,Z is mounted on partition 129 which extends diametrally across the face of reactor 130 and is gas-tightly sealed to the face of $NO_x$-trap 131. Each region X,Y of reactor 130 either side of valve 128 is provided with reactant injector 132X,Y. In the complete reactor 130 as shown, valve 128 is in the central position Z. Valve positions X and Y are shown as insets. Reactor 130 is formed with outlet 134, leading to atmosphere or to further treatment. Preferably, rates of flow in the two halves of reactor 130 are controlled to give a net lean composition and the mixture is passed over an oxicat, in the arrangement shown in FIG. 3 or 5.

In the normal operation of the system, the exhaust gas, comprising steam ($H_2O$ (g)), dinitrogen ($N_2$), oxygen ($O_2$), carbon dioxide ($CO_2$), unburned hydrocarbon fuel (HC), carbon monoxide (CO), nitrogen oxides ($NO_x$) and particulate matter (PM), at e.g. 300° C. contacts catalyst 122 over which NO is oxidised to $NO_2$ and some of the HC and CO are oxidised to steam and $CO_2$. It then enters filter 124 on which most of the PM is collected and combusted by reaction with the $NO_2$ formed in catalyst 122 and possibly with $O_2$. The PM-freed gas then undergoes treatment in one of the 3 modes: 128Z: $NO_x$-trap regions 130X and 130Y both absorb (or adsorb) $NO_x$; 128X: region 131X receives a small fraction of the gas leaving plenum 126 and injection of diesel fuel at 132X. It undergoes regeneration, and its effluent is reunited with that of region 130Y; region 131Y receives the major portion of the gas, absorbs $NO_x$ and passes its effluent to atmosphere at 134; 128Y: region 131Y performs the duty described at 128X.

The engine management system (not shown) changes from region X to region Y when $NO_x$-trap 131Y has free capacity to absorb $NO_x$; and vice versa.

Figure 8:
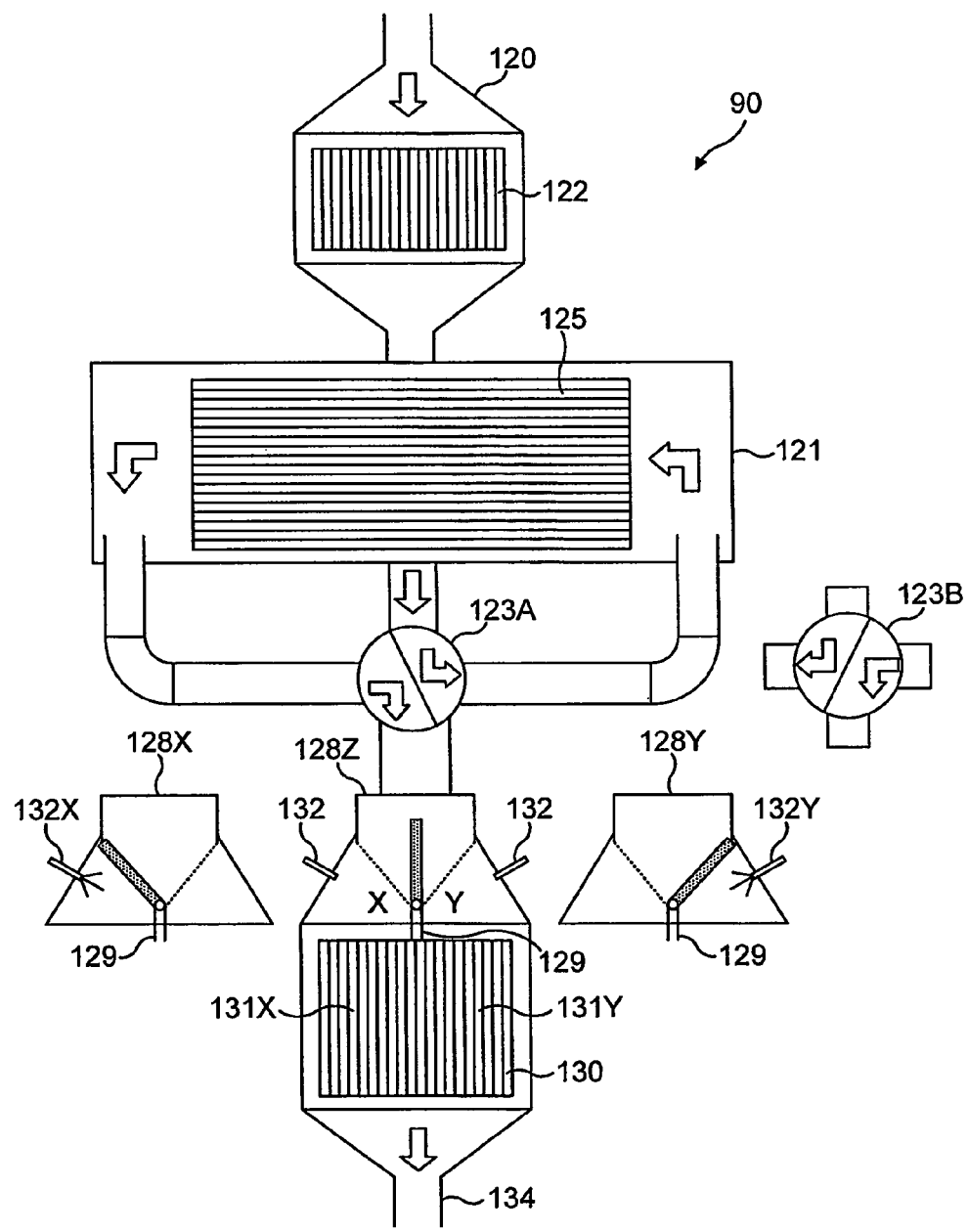
FIG. 8 shows another embodiment of the third aspect of the invention comprising a $NO_x$-trap similar to that of FIG. 7 but using a two-part soot combustion reactor, the second part housing a flow-reversing filter.

Referring to FIG. 8, an alternative exhaust system to the one shown in FIG. 7 is referenced generally by numeral 90 with common features from FIG. 7 having the same reference numbers, wherein reactor 120 now only contains catalyst 122. The PM filter vessel, now numbered 125, is in separate vessel 121. It differs in providing for reversal of the direction of flow through the filter. The outlet of reactor 120 is connected to filter vessel 121 by way of 4-way valve 123, operable in positions 123A and 123B (inset), to give respectively right-hand to left-hand and left-hand to right-hand flow through filter 125, but with no blocking mid-point; since the midpoint bypasses filter 125. Operation of valve 123 is controlled to be very rapid. Leaving filter 125 in either direction, the gas passes through valve 123A or B to $NO_x$-trap 130, which is structurally and functionally as in FIG. 7.

A characteristic of modern diesel engines is that engine out $NO_x$ and/or exhaust gas temperature can be too low for passive filter regeneration using $NO_2$ generated catalytically by oxidation of NO as described in EP-B-0341832. One solution to this problem is to regenerate the filter actively by increasing the temperature in the exhaust system thereby to combust PM on the filter and maintain the back pressure across the filter within acceptable design tolerances. Such active regeneration techniques are described in EP 0758713A, for example.

An advantage of the system disclosed in FIG. 8 to the practical application of the CRT® process is that flow reversal in the filter can be used to clear PM that is not readily combusted in $NO_2$ over a drive cycle. The uncombusted PM can be collected on a second, disposable filter for removal at suitable intervals. Thus, the arrangement has particular use to the retrofit market, providing a practical and economic alternative to installing expensive and fuel-costly active regeneration apparatus.

Figure 9A:
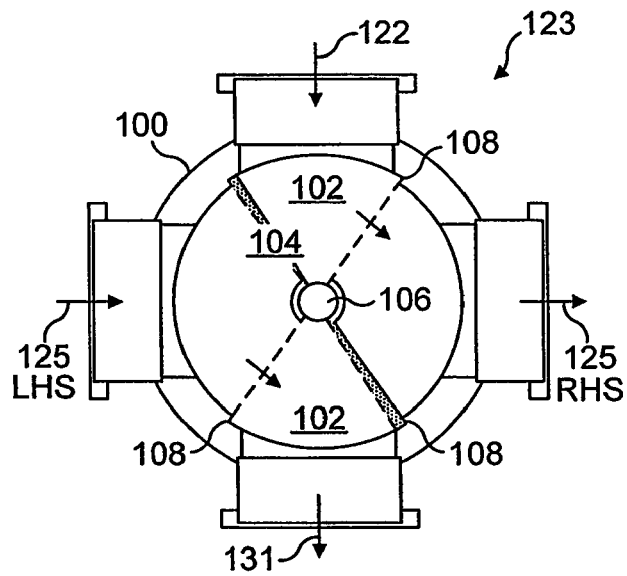
FIGS. 9A (position 123A) and 9B (position 123B) show enlarged plan views of a 4-way valve as used in FIG. 8 representing the two extreme positions of the valve.
Figure 9B:
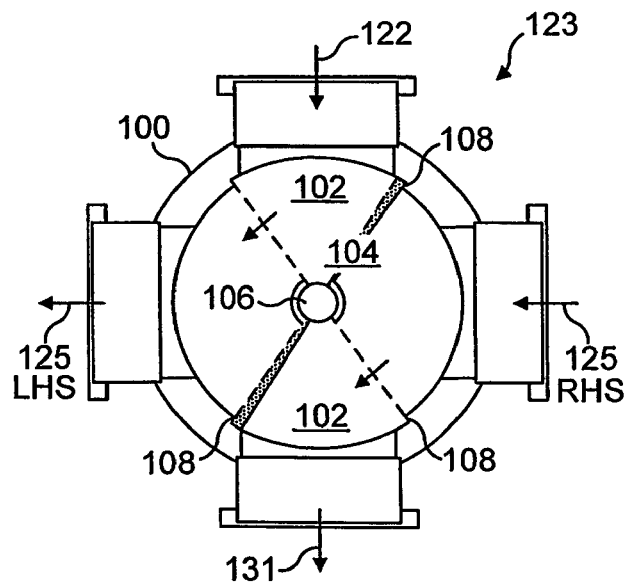

To switch the direction of gas flow in the embodiment shown in FIG. 8, a suitable 4-way valve 123 can be used and is shown in FIGS. 9A and 9B. The plan views shown in these figures relate to an essentially cylindrical valve casing 100 formed internally with circumferential regions 102 of greater diameter, defining the range of traverse of rectangular butterfly deflector 104 having pivoted operating shaft 106 extending out of the valve casing via a seal to an actuator (not shown). The extremities of the range of traverse are defined by steps 108 between the regions differing in diameter, such steps limiting gas leakage out of its intended path. 'LHS' stands for 'left-hand side' and RHS for 'right hand side'.

The arrangements shown in FIGS. 7, 8 and 9 are considered independently inventive for at least the reasons given below. In-system valving is known to be desirable to avoid complicated piping, but its adoption has been limited because valve mechanisms suffer corrosion in relatively hot exhaust gas resulting in pre-end-of-life valve replacement. This concern is particularly relevant in heavy-duty diesel vehicles. However, in the present arrangement, the gas is diesel exhaust which, especially in modern engines, is not as hot as prior art engines; the exhaust gas is relatively low in $SO_x$ because low sulfur diesel is used; downstream of the filter, the gas contains relatively little PM which could foul the valve; and the gas is lean, therefore passivating to steel. Hence, the combination of the features makes in-system valving a practical proposition.

Figure 10:
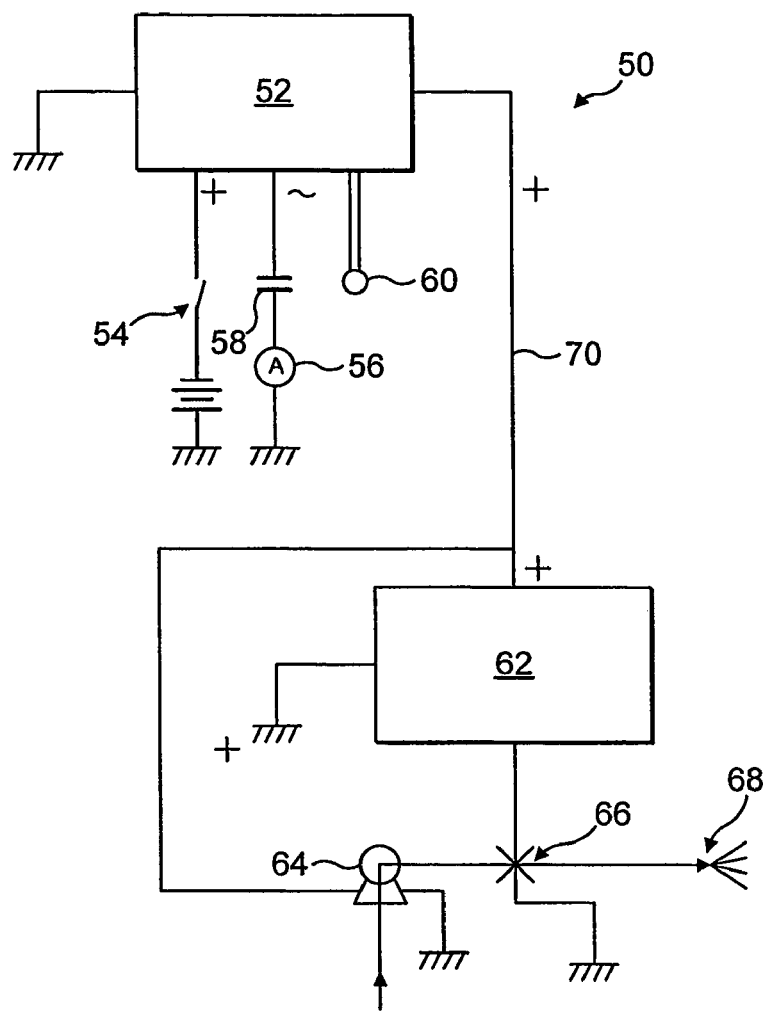
FIG. 10 shows a schematic system according to the fourth aspect of the invention.

In the system 50 depicted in FIG. 10, 52 is a conditional system controller (CSC), 54 is a master switch, 56 is an alternator, 58 is a blocking capacitor, 60 is a thermocouple, 62 is an injection controller (ICU), 64 is a fuel pump, 66 is a valve, 68 is a fuel injector and 70 is a positive power line. The CSC 52 is a switch providing power to the ICU 62 if the master power switch 54 is on, the engine is running as determined by an AC ripple from the alternator 56 present after a DC blocking capacitor 58 and the output of a suitably placed thermocouple 60 to detect the exhaust system is above a minimum pre-determined temperature for reduction of $NO_x$ on a suitable $NO_x$-trap. The master switch 54 need not be connected to the key-on position.

Figure 11:
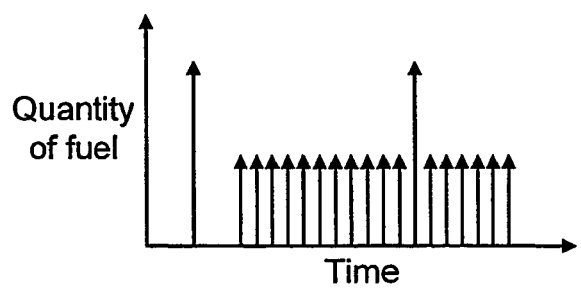
FIG. 11 is a schematic graph plotting quantity of fuel against time showing a fuel injection strategy for use in the system of FIG. 9.

The CSC 52 is designed to generate a continuous tempo and quantity of HC injection when all three features (master switch position, detection of alternator ripple and exhaust gas temperature above a pre-determined minimum) coincide. When the CSC 52 is on, power is supplied to the injection pump 64 and the ICU 62 that operates a solenoid valve 66 to produce a series of pulses to enrich the exhaust gas before it passes over an oxidation catalyst upstream of the $NO_x$ absorbing components. Typically the injection controller will provide occasional relatively very long rich pulses to ensure that the $NO_x$-trap is substantially completely empty and this is followed by a more frequent sequence of shorter enrichment pulses, e.g. injection at 2 seconds every minute, to maintain the storing capability of the $NO_x$-trap (see FIG. 11).

This fuel injection rate is correlated to a chosen $NO_x$ conversion e.g. 90% at the average duty cycle speed. At higher speeds than the average duty cycle speed, there is more $NO_x$ and a greater mass airflow and so $NO_x$ conversion would fall off. However, because higher speeds are less likely, e.g. in city centre buses or refuse trucks, the increased fuel penalty for $NO_x$ conversion achieved resulting from such higher speeds is less across the entire drive cycle compared with prior art arrangements, e.g. that use delayed injection timing. The exact detail of the injection strategy depends on the vehicle and its duty cycle.

Whilst, very generally, the systems employing $NO_x$-traps described herein have been developed to provide simple control mechanisms to predict when $NO_x$-trap regeneration should be done, with particular application to retrofit, many vehicles already include a range of sensors to input data to the ECU for controlling other aspects of vehicular operation. By suitable re-programming of the ECU it is possible to adopt one or more of such existing sensor inputs for the purposes of predicting remaining $NO_x$-trap capacity. These include, but are not limited to, predetermined or predicted time elapsed from key-on or previous regeneration, by sensing the status of a suitable clock means; airflow over the TWC or manifold vacuum; ignition timing; engine speed; throttle position; exhaust gas redox composition, for example using a lambda sensor, preferably a linear lambda sensor; quantity of fuel injected in the engine; where the vehicle includes an exhaust gas recirculation (EGR) circuit, the position of the EGR valve and thereby the detected amount of EGR; engine coolant temperature; and where the exhaust system includes a $NO_x$ sensor, the amount of $NO_x$ detected upstream and/or downstream of the $NO_x$-trap. Where the clock embodiment is used, the predicted time can be subsequently adjusted in response to data input.

The invention claimed is:

1. An exhaust system for exhausting a gas composition from a vehicular lean-burn internal combustion engine, which system comprising a catalyst for reducing $NO_x$ in an exhaust gas to $N_2$ with a suitable reductant, a source of reductant, means for contacting the $NO_x$ reduction catalyst with the reductant, an oxidation catalyst disposed downstream of the $NO_x$ reduction catalyst, means for determining a temperature difference ($\Delta T$) across the oxidation catalyst, and means for controlling reductant addition, wherein the reductant addition control means controls reductant addition at a rate sufficient to maintain $\Delta T$ within a pre-determined range, wherein the system is configured so that the exhaust gas composition over the oxidation catalyst is lean.

2. An exhaust system according to claim 1, further comprising control means to supply reductant to the $NO_x$ reduction catalyst only when the $NO_x$ reduction catalyst is active.

3. An exhaust system according to claim 1, wherein the rate of reductant addition is decreased if $\Delta T$ is larger than a predetermined temperature.

4. An exhaust system according to claim 1, wherein the $NO_x$-reduction catalyst comprises a plurality of $NO_x$-traps, each $NO_x$-trap disposed on a unitary monolith substrate and arranged in parallel, wherein each substrate is associated with a reductant injector, and wherein the means for contacting successively contacts at least one of the parallel substrates with the reductant.

5. An exhaust system according to claim 1, wherein the reductant is a hydrocarbon and the $NO_x$ reduction catalyst is a lean-$NO_x$ catalyst.

6. An exhaust system according to claim 5, wherein the $NO_x$ reduction catalyst comprises a $NO_x$-absorbent.

7. An exhaust system according to claim 1, wherein the reductant is a $NO_x$-specific reactant and the $NO_x$ reduction catalyst is a selective catalytic reduction (SCR) catalyst.

8. An exhaust system according to claim 7, wherein the $NO_x$ reduction catalyst comprises a $NO_x$-absorbent.

9. An exhaust system for a vehicular lean-burn internal combustion engine according to claim 1, wherein the NOx reduction catalyst comprises a NOx-trap disposed on a unitary monolith substrate, the upstream end of the monolith substrate is divided in the direction of fluid flow into at least two zones, and wherein the means for successively contacting contacts a fraction of the at least two zones with the reductant whilst the NOx-trap as a whole remains in-line to exhaust gas flow.

10. An exhaust system according to claim 9, wherein the means for contacting the $NO_x$-trap fraction with reductant comprises a flap valve disposed at the upstream end of the substrate thereby dividing the substrate into the at least two zones.

11. An exhaust system according to claim 10, further comprising an injector associated with each zone.

12. A method of controlling, by feedback, addition of a reductant to a catalyst for reducing $NO_x$ to $N_2$ in an exhaust gas of a vehicular lean-burn internal combustion engine having an exhaust gas inlet and an exhaust gas outlet, which method comprises providing an oxidation catalyst for oxidising the reductant in lean exhaust gas downstream of the $NO_x$ reduction catalyst, measuring the exhaust gas temperature upstream of the oxidation catalyst, measuring the exhaust gas temperature downstream of the oxidation catalyst, determining a temperature difference ($\Delta T$) between the upstream and the downstream of the oxidation catalyst and adjusting a rate of reductant addition so that $\Delta T$ is within a pre-determined range.

13. A method according to claim 12, wherein the reductant is supplied to the $NO_x$ reduction catalyst only when the $NO_x$ reduction catalyst is active for catalysing $NO_x$ reduction.

14. A method according to claim 12, wherein the rate of reductant addition is decreased if $\Delta T$ is above a predetermined temperature.

15. A method according to claim 12, wherein the $NO_x$-reduction catalyst is a $NO_x$-trap disposed on a unitary monolith substrate, further comprising the steps of contacting a fraction of the $NO_x$-trap with a reductant while the $NO_x$-trap as a whole remains in-line to exhaust gas flow.

16. A method according to claim 12, wherein the $NO_x$ reduction catalyst comprises a plurality of $NO_x$-traps, each $NO_x$ reduction catalyst disposed on a unitary monolith substrate, arranged in parallel, each substrate associated with a reductant injector, which method further comprising successively contacting at least one of the parallel substrates with the reductant.

17. A method according to claim 12, wherein the reductant is a hydrocarbon and the catalyst is a lean-$NO_x$ catalyst.

18. A method according to claim 17, wherein the catalyst comprises a $NO_x$-absorbent.

19. A method according to claim 12, wherein the reductant is a $NO_x$-specific reactant and the catalyst is a selective catalytic reduction (SCR) catalyst.

20. A method according to claim 19, wherein the catalyst comprises a $NO_x$-absorbent.

* * * * *